(12) United States Patent
Julien et al.

(10) Patent No.: US 9,429,724 B2
(45) Date of Patent: Aug. 30, 2016

(54) STACKABLE INTERFACE MODULES FOR CUSTOMIZED NETWORK FUNCTIONS

(75) Inventors: Martin Julien, Laval (CA); Robert Brunner, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 580 days.

(21) Appl. No.: 13/360,176

(22) Filed: Jan. 27, 2012

(65) Prior Publication Data

US 2013/0198414 A1 Aug. 1, 2013

(51) Int. Cl.
*G02B 6/42* (2006.01)

(52) U.S. Cl.
CPC .............. *G02B 6/423* (2013.01); *G02B 6/4246* (2013.01); *G02B 6/4249* (2013.01); *G02B 6/4261* (2013.01); *G02B 6/4284* (2013.01); *G02B 6/4292* (2013.01)

(58) Field of Classification Search
CPC ....... H04L 49/15; H04L 12/56; G06F 15/16; G02B 6/423; G02B 6/4249; G02B 6/4284; G02B 6/4261; G02B 6/4292; G02B 6/4246
USPC .......................................... 361/728, 724–726
See application file for complete search history.

(56) References Cited

U.S. PATENT DOCUMENTS

| | | | |
|---|---|---|---|
| 4,703,394 A * | 10/1987 | Petit et al. ..................... | 361/790 |
| 5,966,510 A * | 10/1999 | Carbonneau .......... | G06F 3/0607 710/18 |
| 6,206,713 B1 | 3/2001 | Baertsoen et al. | |
| 6,546,010 B1 | 4/2003 | Merchant et al. | |
| 6,793,539 B1 * | 9/2004 | Lee et al. ...................... | 439/701 |
| 6,831,837 B2 * | 12/2004 | Chang ........................... | 361/715 |
| 6,908,324 B1 * | 6/2005 | Morley et al. ................ | 439/218 |
| 7,314,384 B2 * | 1/2008 | Togami et al. ............... | 439/484 |
| 7,350,984 B1 * | 4/2008 | Togami et al. ................ | 385/89 |
| 7,553,091 B2 | 6/2009 | McColloch | |
| 7,744,423 B2 * | 6/2010 | Funahashi ..................... | 439/638 |
| 7,934,959 B2 * | 5/2011 | Rephaeli et al. ............. | 439/638 |
| 8,142,357 B2 * | 3/2012 | Suyama ............. | A61B 5/02055 368/11 |
| 8,231,397 B2 * | 7/2012 | Ottliczky ...................... | 439/192 |
| 8,419,444 B2 * | 4/2013 | Kagan et al. ................. | 439/76.1 |
| 2002/0051284 A1 * | 5/2002 | Takatsu et al. ............. | 359/341.1 |
| 2005/0130503 A1 * | 6/2005 | Flemming et al. ........... | 439/638 |
| 2006/0209886 A1 * | 9/2006 | Silberman et al. ........... | 370/466 |

(Continued)

OTHER PUBLICATIONS

"Wavelength-division multiplexing", downloaded on Sep. 4, 2013 from Internet website http://en.wikipedia.org/wiki/DWDM#Dense_WDM; 4 pages.

(Continued)

*Primary Examiner* — Adrian S Wilson
*Assistant Examiner* — Abhishek Rathod
(74) *Attorney, Agent, or Firm* — Ericsson Inc.

(57) ABSTRACT

A function-specific network interface module is provided which includes a housing and a connection interface at opposing ends of the housing configured to connect to another function-specific network interface module in a cascaded manner. The function-specific network interface module further includes one or more circuit components operable to provide a dedicated network function so that a plurality of different network functions is provided when the function-specific network interface module is connected to the other function-specific network interface module via the connection interface.

18 Claims, 14 Drawing Sheets

(56) References Cited

U.S. PATENT DOCUMENTS

| | | | |
|---|---|---|---|
| 2006/0215968 A1* | 9/2006 | Kayner et al. | 385/89 |
| 2007/0010132 A1* | 1/2007 | Nelson | G02B 6/4201 |
| | | | 439/577 |
| 2007/0237463 A1* | 10/2007 | Aronson | 385/89 |
| 2008/0114217 A1* | 5/2008 | Suyama | A61B 5/02055 |
| | | | 600/300 |
| 2009/0296705 A1 | 12/2009 | Niigata | |
| 2011/0243567 A1 | 10/2011 | Su et al. | |
| 2012/0057821 A1* | 3/2012 | Aronson et al. | 385/39 |
| 2012/0263415 A1* | 10/2012 | Tan et al. | 385/33 |
| 2013/0195396 A1* | 8/2013 | Julien et al. | 385/14 |
| 2013/0279853 A1* | 10/2013 | Lam et al. | 385/33 |

OTHER PUBLICATIONS

International Search Report for PCT/IB2013/050675, mailing date of May 29, 2013; 4 pages.

* cited by examiner

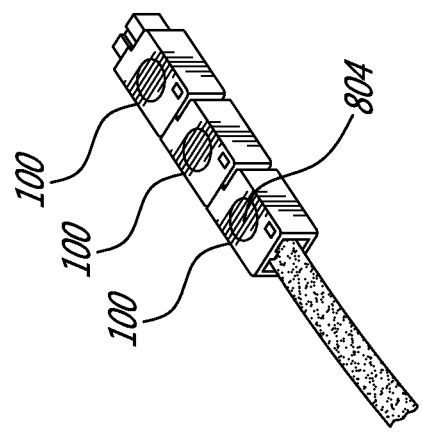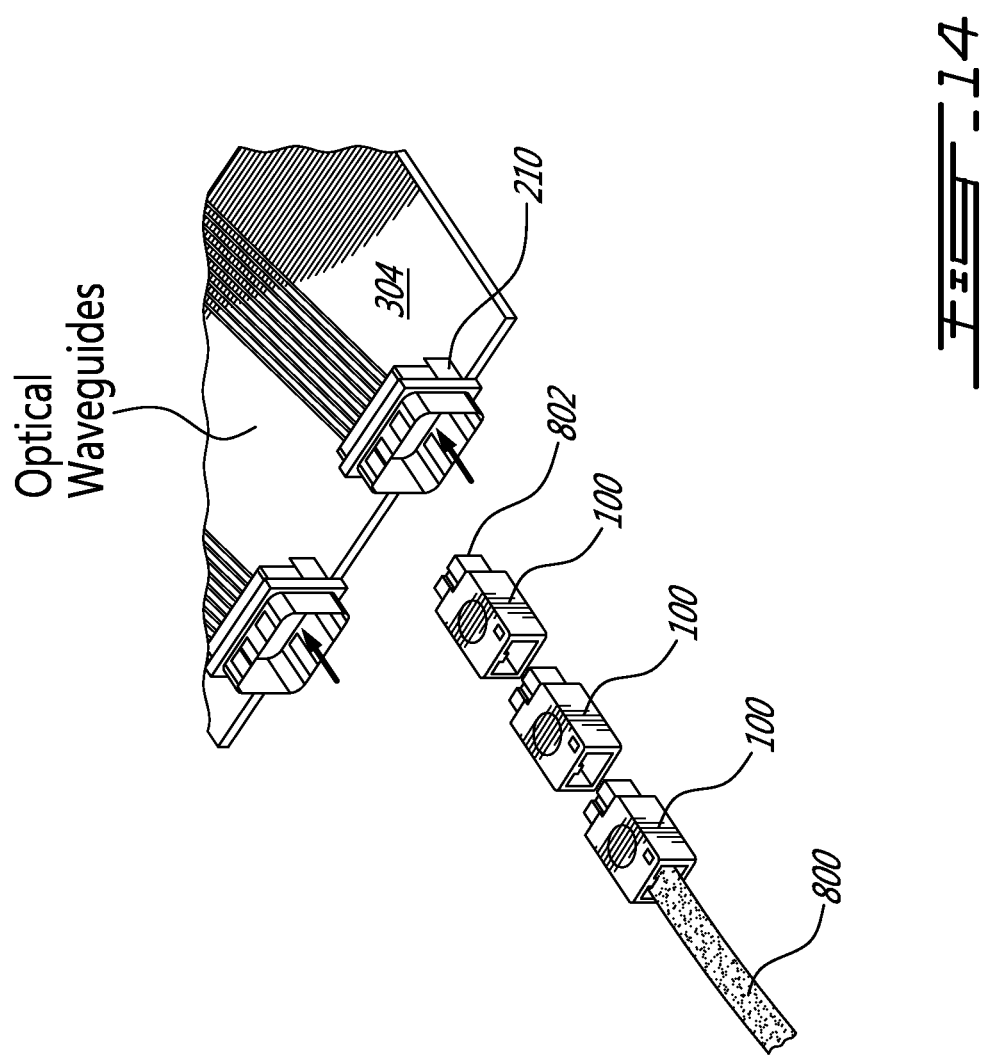
FIG-14

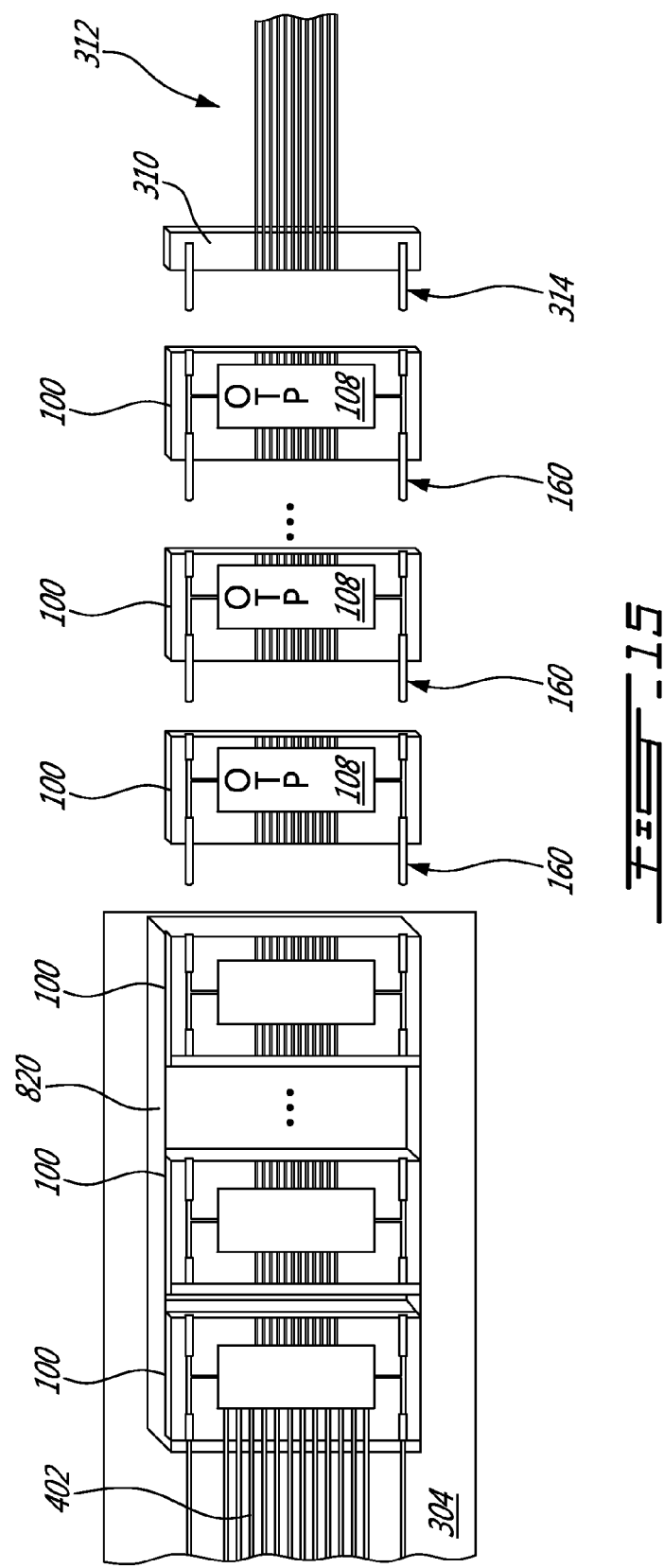

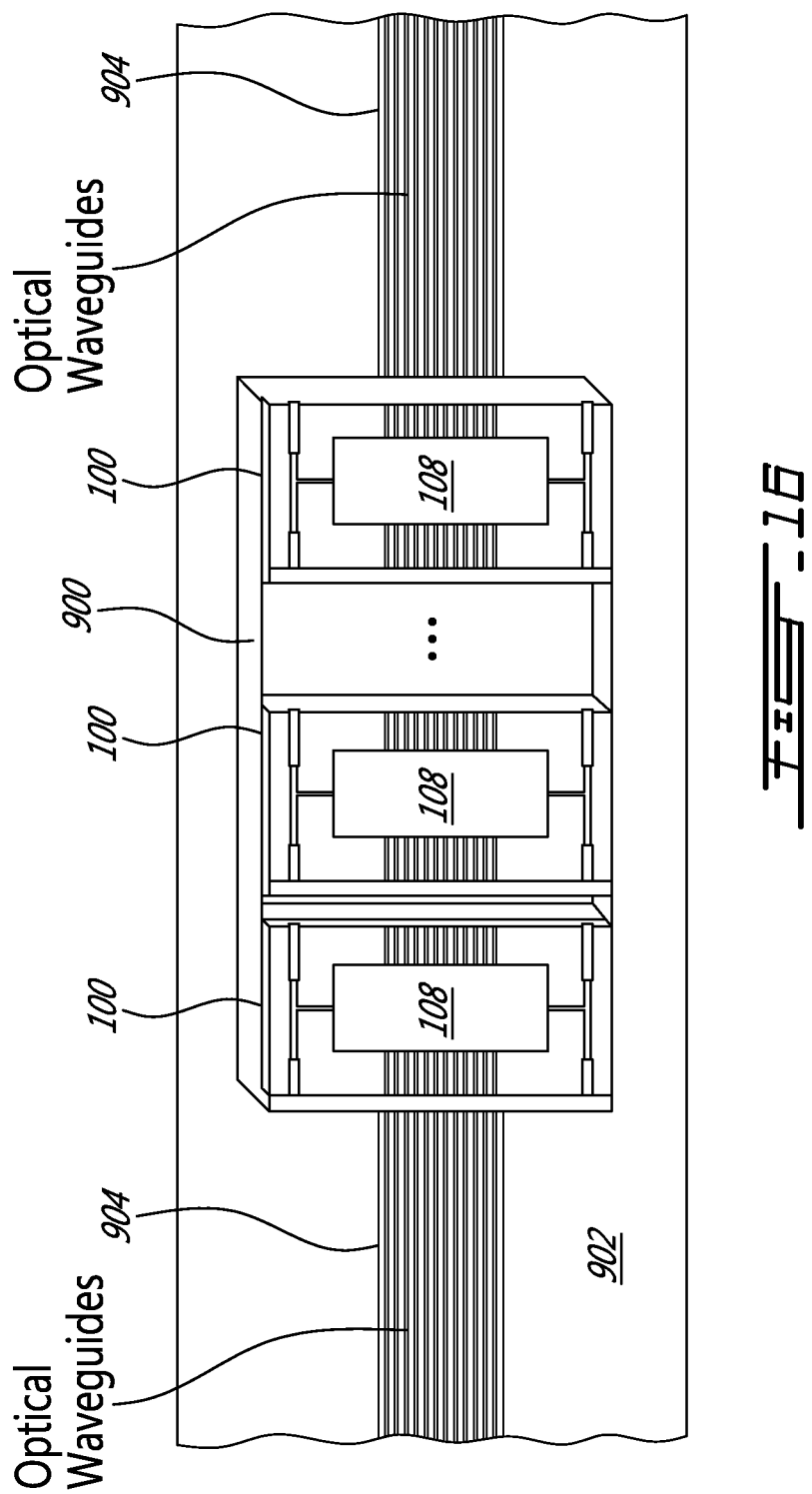

STACKABLE INTERFACE MODULES FOR CUSTOMIZED NETWORK FUNCTIONS

TECHNICAL FIELD

The present invention generally relates to network communications, and more particularly relates to providing customized network functions at the edge of a network.

BACKGROUND

Physical interface modules, such as the 'enhanced Small Form-factor Pluggable' module (SFP+), the 'Quad Small Form-factor Pluggable' module (QSFP) and the '120 Gb/s 12× Small Form-factor Pluggable' module (CXP), are compact, hot-pluggable transceivers used for both telecommunication and data communications applications. Physical interface modules are typically used to interface a network device to a fiber optic or copper networking cable. For example, an SFP+ module is typically inserted into an SFP+ cage on an electronic device, such as a server or a switch.

Physical interface modules are hot-swappable electronic components that have an electrical interface toward an electronic device being interfaced with the network, and a specific copper or optical interface toward the network. Physical interface modules are widely used because of their hot-swappable characteristic, which also means that they are replaceable at run-time. While preserving the same electrical interface with the electronic devices, several different copper or optical interfaces can be used toward the network. Such flexibility has resulted in wide adoption of physical interface modules.

There are different variants of physical interface modules, mainly depending on the required bandwidth, speed, power and distance of the interconnection.

While there are several variants of physical interface modules, they typically all have the characteristic of being pluggable at the edge of electronic cards, boards or boxes. Once the physical interface module is inserted on the edge of the device, a networking cable can be connected to the physical interface module. For example, a physical interface module can be inserted in an MSA (multi-source agreement) compliant module cage located on a PCB (printed circuit board). Each PCB may have an MSA-compliant module cage holding a physical interface module.

Similar to the concept of physical interface modules, an active optical cable (AOC) is located on the edge of an electronic card, board or box. An AOC typically reuses the same electrical interface as a physical interface module, such as a QSFP module, as well as the same module cage typically located on the electronic equipment. One of the main differences between a physical interface module, such as a QSFP module, and an AOC, such as an AOC-based QSFP, is that the AOC does not provide a standardized networking interface, only a standardized electrical interface toward the electronic device. For example, in the case where an AOC vendor provides an optical signal at a specific non-standardized wavelength, then only that vendor can interconnect with its own equipment. Since an AOC vendor needs to provide the cable and both terminations of the cable, the technologies which can be used between both ends of the cable can be vendor specific.

Both ends of an AOC are terminated with a physical interface module. The modules themselves cannot be separated from the cable. Two PCBs can be connected using an active optical cable. A standard compliant MSA cage is installed on each PCB. The AOC has connectors at both ends, which includes an optical engine in each connector. The optical engines are responsible for converting signals between the electrical and optical domains. In order to interconnect the two PCBs, an active optical cable is used, where each end of the cable is inserted in each module cage of the PCBs.

The module cage is a cage where a compliant physical interface module or AOC can be inserted. The cage can be used as a guide toward the backend connector of a physical interface module or AOC, in order to interface the PCB upon insertion. The connector typically uses electrical traces, where data, control and power are communicated.

By using standardized physical interface modules and AOCs, electronic equipment such as servers, switches and routers can be developed with the option of leaving to the network operators the task of carefully selecting the required network interface at deployment time. While such an approach has some advantages, there are a few optimizations that could be considered in order to better address the increasingly important challenges concerning footprint and energy consumption.

For example, a large part of the energy consumed by a physical interface module located on the edge of a board, such as a CXP module or an AOC, is used to interface the electronic components directly located on the same board. This means that modules located on the edge of cards or boards could greatly reduce their power consumption if the length of electrical traces between electronic components on PCBs, such as ASICs (application-specific integrated circuits), and a physical interface module located on the edge of the PCBs were significantly shortened.

Also, physical interface modules are typically designed for flexibility and interoperability, resulting in their form-factor not necessarily being optimized in terms of size. For example, the same QSFP physical interface module specification can be used for short-reach and for long-reach applications. While the long-reach variant requires significantly more power than the short-reach variant, the specification of the form-factor for the QSFP module is typically based on the required power consumption of the long-reach variant. As such the size of a physical interface module is typically much larger than what could be minimally required.

Recently a new type of electronic component has received more widespread use for interfacing electronic equipment: optical engines. Optical engines are components used to convert electrical signals into optical signals, and vice-versa. The way in which optical engines are typically built requires them to be placed in very close proximity to the source of the electrical signals being converted into optical signals. While the close proximity minimizes the length of electrical traces, the complexity of electronic components typically required in CXP modules and AOCs can be greatly reduced, such as eliminating the need for Clock Data Recovery (CDR) functions. That reduced complexity brings smaller footprint and power savings.

Optical engines can be extremely small, and in comparison with an equivalent standardized physical interface module, optical engines can be smaller by an order of magnitude. While there are several different vendor-specific variants of optical engines and no standardized form-factor and vendor agreement for building optical engines, optical engines are aimed at providing extremely efficient and optimized solutions in terms of energy consumption and footprint. The lack of standardization for optical engines can result in functional incompatibility and incompatible optical engine form-factors.

Optical fiber connectors are also typically used at the edge of a network. An optical fiber connector terminates the end of an optical fiber. A connector mechanically couples and aligns the cores of fibers so that light can pass. Optical fiber connectors are used to join optical fibers where a connect/disconnect capability is required. In telecommunication and data communications applications, small connectors, e.g., so-called LC, and multi-fiber connectors, e.g., so-called MTP, are replacing more traditional connectors (e.g., so-called SC), mainly to provide a higher number of fibers per unit of rack space.

A type of MT connector, e.g. an MTP or MPO connector, can be used to interconnect up to 72 optical waveguides. The alignment of the optical fibers is possible because of the alignment pins available on the MT connectors. In the case where multiple MT connectors are required, an array connector can be used to hold several MT connectors. For example, each MT connector allows up to 72 optical channels. While each MT connector has alignment pins, additional alignment pins for the array connector itself are also provided. As such, an array connector can be very large.

Each of the network edge components described above have disadvantages. For example, currently network functions are only provided directly on PCBs or on modules located on PCBs and thus additional space is required on a PCB layout for supporting networking functions. Currently, it is not possible to cascade pluggable interface modules. Also pluggable modular network functions, such as optical switching and wavelength conversion, do not exist presently. When needed, interface functions are included in more complex interface modules to provide tailored solutions, which typically lack flexibility and offer limited capabilities. Modules that include more network functions than minimally required typically result in significantly larger modules which are more expensive and less energy efficient. Such modules also do not interface with other similar modules. Legacy MSA cages represent a waste of space when the latest technologies provide an equivalent functionality in much less space. While optical engines are gaining popularity for network interconnections, the lack of standardization for optical engines can result in functional incompatibility and incompatible optical engine form-factors. Moving forward, optical backplanes or interconnects will become more important and require network functions inside the backplanes themselves, or interconnects. It is not possible today to provide network functions on backplanes with a pluggable network interface module concept.

SUMMARY

Network interface modules are described herein which provide dedicated network functions other than merely transceiver-related functions, such as receiver and transmitter functions. The network interface modules perform functions that typically allow for more flexibility and customized network functions to servers and devices. Functions such as wavelength conversion, optical channel multiplexing and signal encoding, are examples of function-specific network interface modules allow more flexibility with regard to network interfaces.

More complex functions can be realized by cascading several of these modules together, which is akin to a logical sequencing of building blocks. Depending on the desired behavior, a strategic selection of function-specific modules can be performed, as well as a strategic sequencing of these modules.

The modules can have a common interface to more easily facilitate the cascading of several network interface modules. The common interface uses data signals, and may have control signals, and alignment and/or power pins depending on the type of module and application.

The modules can be cascaded using Zero-Force-Insertion (ZFI), which allows the modules to be cascaded without applying any insertion force. Good contact between the modules can be ensured by using Zero Back Lash (ZBL) screws which allow the modules to be tightly connected together. Spring loaded contacts or alignment pins can be provided for provisioning power and control signals to the modules, if needed.

The modules can be cascaded inside an MSA-compliant or stack optimized module cage e.g. located either on a circuit board such as PCB or on a cable connector. As another alternative, multiple function-specific network interface modules can be directly interconnected together without requiring any specific module cage.

According to an embodiment of a function-specific network interface module, the module includes a housing, a connection interface at opposing ends of the housing configured to connect to another function-specific network interface module in a cascaded manner and one or more circuit components. The one or more circuit components are operable to provide a dedicated network function so that a plurality of different network functions is provided when the function-specific network interface module is connected to the other function-specific network interface module via the connection interface.

According to an embodiment of a customizable network interconnect, the network interconnect includes a plurality of function-specific network interface modules each having a housing and a connection interface at opposing ends of the housing. Each one of the plurality of function-specific network interface modules is connected to a different one of the plurality of function-specific network interface modules in a cascaded manner via the connection interfaces. Each one of the plurality of function-specific network interface modules is operable to provide a dedicated network function so that the plurality of function-specific network interface modules collectively provide a plurality of different network functions when connected together.

According to an embodiment of a method of providing a plurality of different network functions at an edge of a network, the method includes: providing a plurality of function-specific network interface modules each having a housing and a connection interface at opposing ends of the housing; connecting each one of the plurality of function-specific network interface modules to a different one of the plurality of function-specific network interface modules at the edge of the network in a cascaded manner via the connection interfaces; and operating each one of the plurality of function-specific network interface modules to provide a dedicated network function so that the plurality of function-specific network interface modules collectively provide a plurality of different network functions.

Those skilled in the art will recognize additional features and advantages upon reading the following detailed description, and upon viewing the accompanying drawings.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

FIG. 14 is a diagram of a plurality of function-specific network interface modules cascaded together at the end of an optical cable according to embodiment.

FIG. 15 is a diagram of a plurality of function-specific network interface modules cascaded together in a module cage at the edge of a circuit card according to an embodiment.

FIG. 16 is a diagram of a plurality of function-specific network interface modules cascaded together in a module cage connected at both ends to a circuit card according an embodiment.

DETAILED DESCRIPTION

Figure 1:
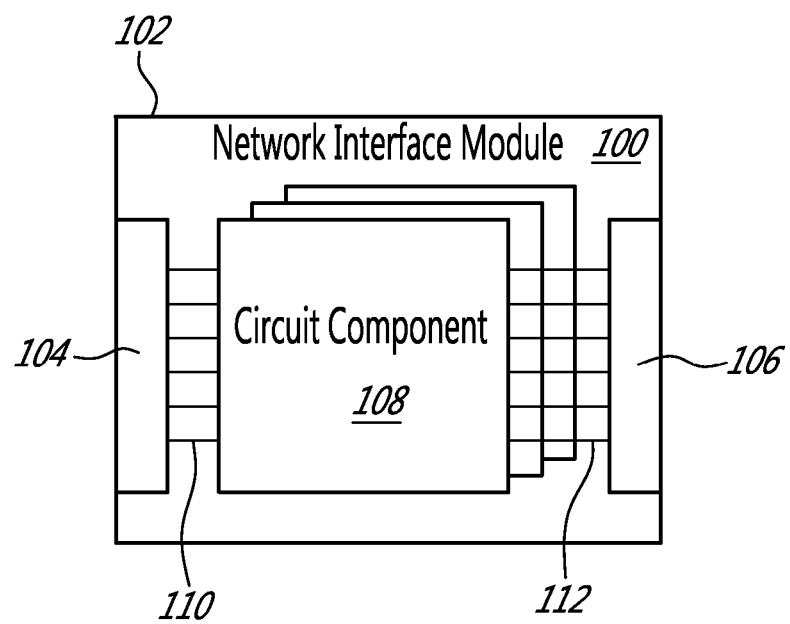
FIGS. 1-5 are diagrams of a function-specific network interface module according to various embodiments.

As a non-limiting example, FIG. 1 illustrates a function-specific network interface Module 100 which includes a housing 102 and a connection interface 104, 106 at opposing ends of the housing 102. Each connection interface 104, 106 is configured to connect to another function-specific network interface module in a cascaded manner.

The network interface module 100 is function-specific in that the module 100 provides one or more dedicated network functions other than merely transceiver-related functions, such as receiver and transmitter functions. To this end, the network interface module 100 also includes one or more circuit components 108 for providing one or more dedicated network functions so that a plurality of different network functions can be provided by connecting the module 100 to one or more other function-specific network interface modules via the connection interfaces 104, 106. The network interface module 100 performs one or more dedicated functions that allow for more flexibility and customized network functions to servers and devices. Of course, the module 100 can also provide conventional transceiver functions into addition to the dedicated function(s). More complex functions can be realized by cascading several of these modules 100 together.

Each circuit component 108 included in the function-specific network interface Module 100 can process electrical signals, optical signals, or convert between electrical and optical signals. Accordingly, the connection interface 104, 106 at each end of the module 100 can be connected to one or more circuit components inside the module 100 by a signal pathway 110, 112 which can be electrical e.g. electrical traces or wires or optical e.g. fiber cables or other optical waveguides, depending on the type of component 108 the corresponding connection interface 104, 106 is connected to. For example, if the connection interface 104 on the left-hand side of the network interface module 100 in FIG. 1 is connected to a circuit component 108 which processes or converts incoming electrical signals, the signal pathway 110 between the connection interface 104 and the circuit component 108 is electrical. Alternatively, if the connection interface 104 is connected to a circuit component 108 which processes or converts incoming optical signals, the signal pathway 110 between the connection interface 104 and the circuit component 108 is optical. The same applies for the connection interface 106 on the right-hand side of the network interface module 100 in FIG. 1. Accordingly, the network interface module 100 may include electrical and/or optical circuit components 108 and may have external electrical interfaces only, external optical interfaces only or both electrical and optical external interfaces.

As described above, the network interface module 100 provides one or more specific functions other than merely transceiver-related functions. For example, wavelength conversion, optical channel multiplexing and signal encoding are examples of dedicated functions the function-specific network interface module 100 can provide to allow more flexibility and customization at the edge of a network e.g. to servers and other devices at the network edge.

The function-specific network interface module 100 can also have electrical and/or optical interfaces 104, 106 as described above. For example, the module 100 may be required to support electrical-to-electrical, electrical-to-optical or optical-to-optical interfaces. Depending on the specific function(s) required of the module 100, an electrical or an optical interface 104, 106 can be provided at either end of the module 100.

Networks used for interconnecting internal system components and for interconnecting different systems located on different geographical sites use optical technologies. A collection of the function-specific network interface modules 100 described herein can be deployed which allow more flexibility with regard to a specific optical technology used on a network, by cascading these modules. The system or components of a system at the edge of an optical network can comply with the requirements of the network by selectively cascading different ones of the function-specific network interface modules 100 with each module 100 providing a different dedicated network-function(s). The aggregate of these different dedicated functions yields one or more complex functions in support of the optical networking technology deployed.

Figure 2:
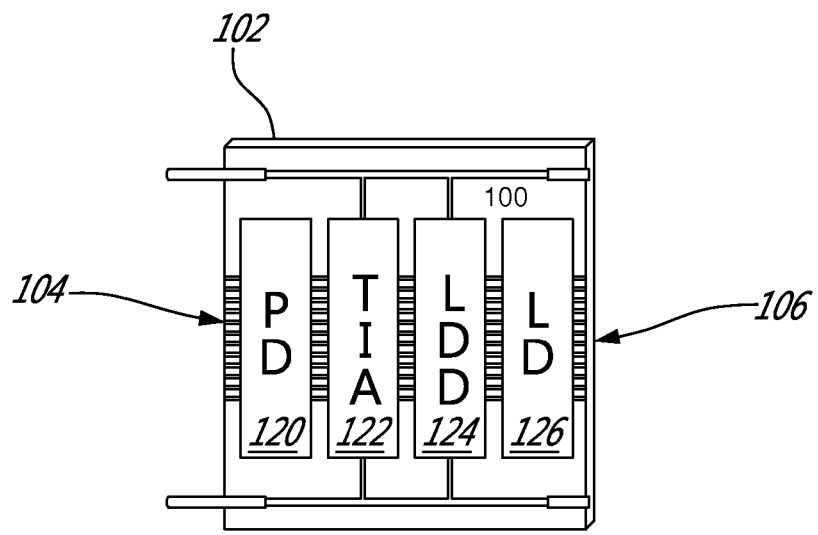

FIG. 2 illustrates another embodiment of the function-specific network interface module 100. The module 100 includes several circuit components 108 according to this embodiment, including a photodetector (PD) 120, a transimpedance amplifier (TIA) 122, a laser diode driver (LDD)

124 and a laser diode (LD) 126. The photodetector 120 converts incoming light at one connection interface 104 of the module 100 to electrical signals, and the transimpedance amplifier 122 converts the current from the photodetector 120 to voltage. The laser diode driver 124 delivers the current required by the laser diode 126 to operate for a particular application e.g. for converting optical channels between multi-mode and single-mode, as well as for allowing an optical wavelength used by an optical channel to be converted into another wavelength. These functions can be used for aggregating several optical channels in parallel waveguides sharing the same wavelength into a single waveguide with a distinct wavelength per optical channel. Even though the function-specific network interface module 100 can convert an optical wavelength into another one, several different modules 100 can also be provided, depending on the specific wavelengths to be converted.

Figure 3:
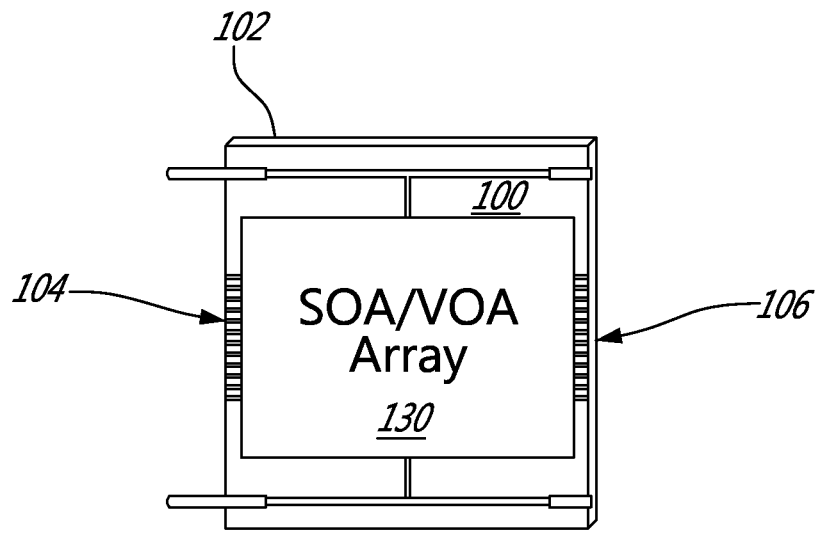

FIG. 3 illustrates yet another embodiment of the function-specific network interface module 100. According to this embodiment, the module 100 includes an SOA (semiconductor optical amplifier) and/or a VOA (variable optical attenuator) component 130. The module 100 can amplify and/or attenuate optical signals according to this embodiment. As an example, such functions can be used to increase the maximum distance for optical channels, or to attenuate an incoming optical channel.

Figure 4:
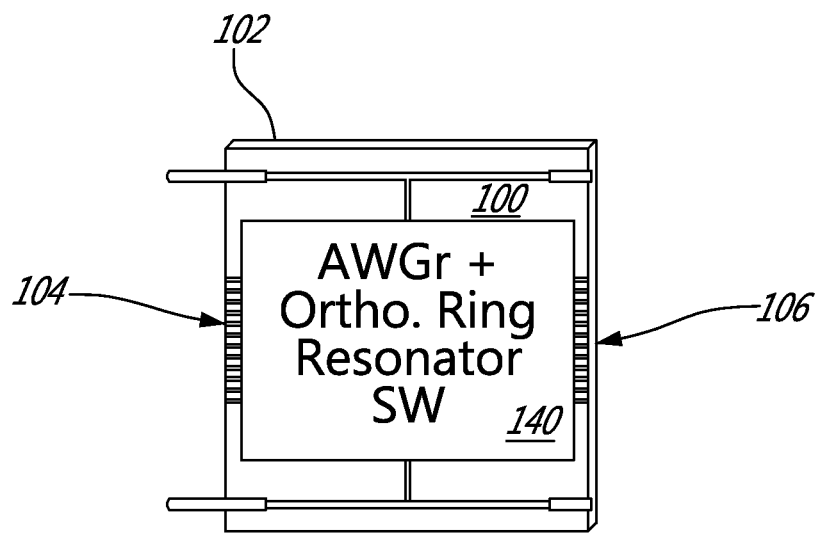

FIG. 4 illustrates still another embodiment of the function-specific network interface module 100. According to this embodiment, the module 100 includes an arrayed waveguide grating router (AWGr) and an orthogonal ring resonator switch component 140. The network interface module 100 functions as an optical lane transposition switch according to this embodiment for allowing a reconfigurable transposition of optical signals. Such functions can be used to redirect optical signals according to the network needs.

Figure 5:
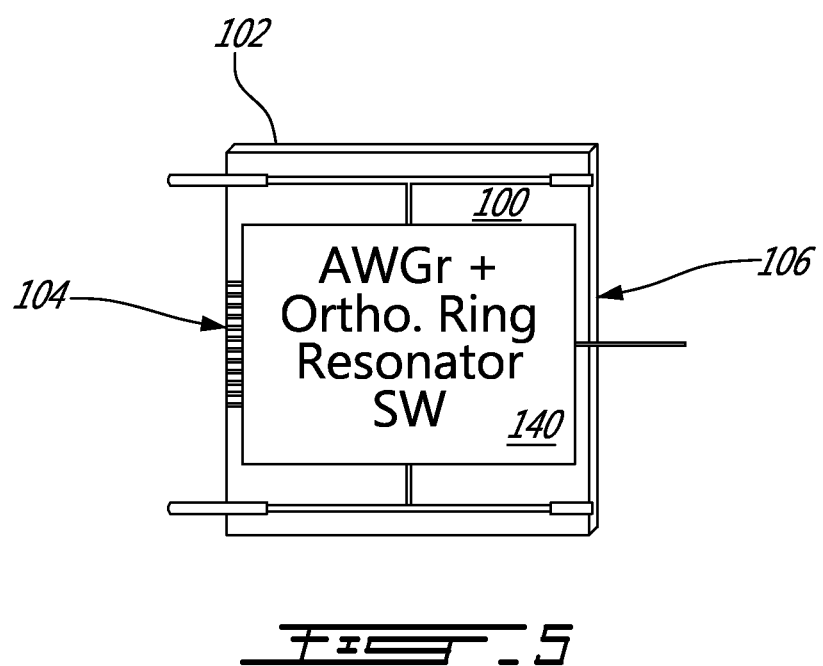

FIG. 5 illustrates an embodiment of the function-specific network interface Module 100 which is similar to the one shown in FIG. 4, except the module of FIG. 5 filters optical channels. The optical filter can be static or dynamically configurable.

More complex functions can be achieved by cascading several of the function-specific network interface modules 100 described herein. Depending on the desired behavior, a strategic selection and sequencing of the function-specific modules 100 yields the desired network functions when connected together.

Figure 6:
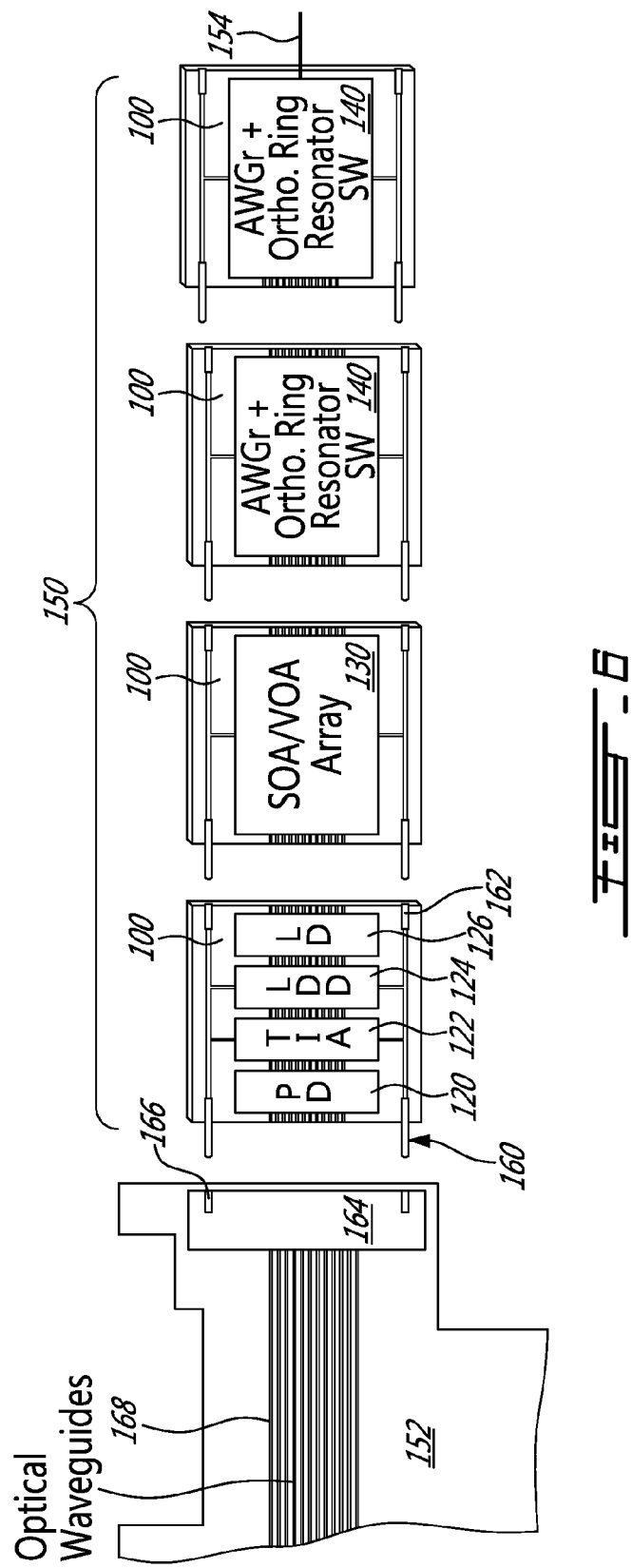
FIG. 6 is a diagram of a plurality of function-specific network interface modules cascaded together at the edge of a circuit card according to an embodiment.

FIG. 6 illustrates an embodiment of a customizable network interconnect 150 including a plurality of function-specific network interface modules 100 cascaded together. Each network interface module 100 provides a dedicated network function, so that the modules 100 collectively provide a plurality of different network functions when connected together to yield a desired required networking interface. The function-specific network interface modules 100 cascaded together can make a system or device at the edge of a network compatible with a new or existing network. In one example, optical signals sent from a circuit board 152 such as a PCB are converted from multi-mode to single-mode via the left-most (first) network interface module 100, then converted from parallel optical channels at the same wavelength to parallel optical channels at different wavelengths and amplified via the second network interface module 100, then transposed between the available optical waveguides via the third and fourth network interface modules 100, and finally multiplexed onto one or several optical waveguides 154. Various other combinations of the same function-specific modules 100 are possible to provide yet a different set of network functions. For example, if the transposition function is not required, the sequence of modules 100 would not include the function-specific module performing lane transposition.

Several of the function-specific network interface modules 100 can be cascaded together to produce various customized network functions as described above. The function(s) provided by the individual modules 100 and the sequence of modules 100 determines the customized network functions. To connect several of the function-specific network interface modules 100, the connection interface 104, 106 at each end of the individual modules 100 can be pluggable e.g. using a common connection interface between the modules 100. The common module interface has data signals, and may require control signals, and alignment and power pins. The modules 100 shown in FIGS. 2-6 show an embodiment where alignment pins 160 are used to aid in cascading the modules 100 together, and which optionally can be used to carry control signals and/or power to the modules 100. According to this embodiment, the connection interface 104/106 at one end of each module 100 has alignment pins 160 for inserting in corresponding openings 162 in the corresponding connection interface 106/104 of the adjacent module 100.

In FIG. 6, the circuit board 152 also has a receptacle/connector/adapter 164 disposed at the edge of the board for connecting with the left-most network interface module 100, e.g. by receiving the alignment pins 160 of this module 100 in corresponding openings 166 of the receptacle/connector/adapter 164. The other end of the receptacle/connector/adapter 164 is coupled to a component on the circuit board 152 such as an optical engine via optical waveguides 168, but alternatively can be electrically coupled to an electronic component instead.

Figure 7:
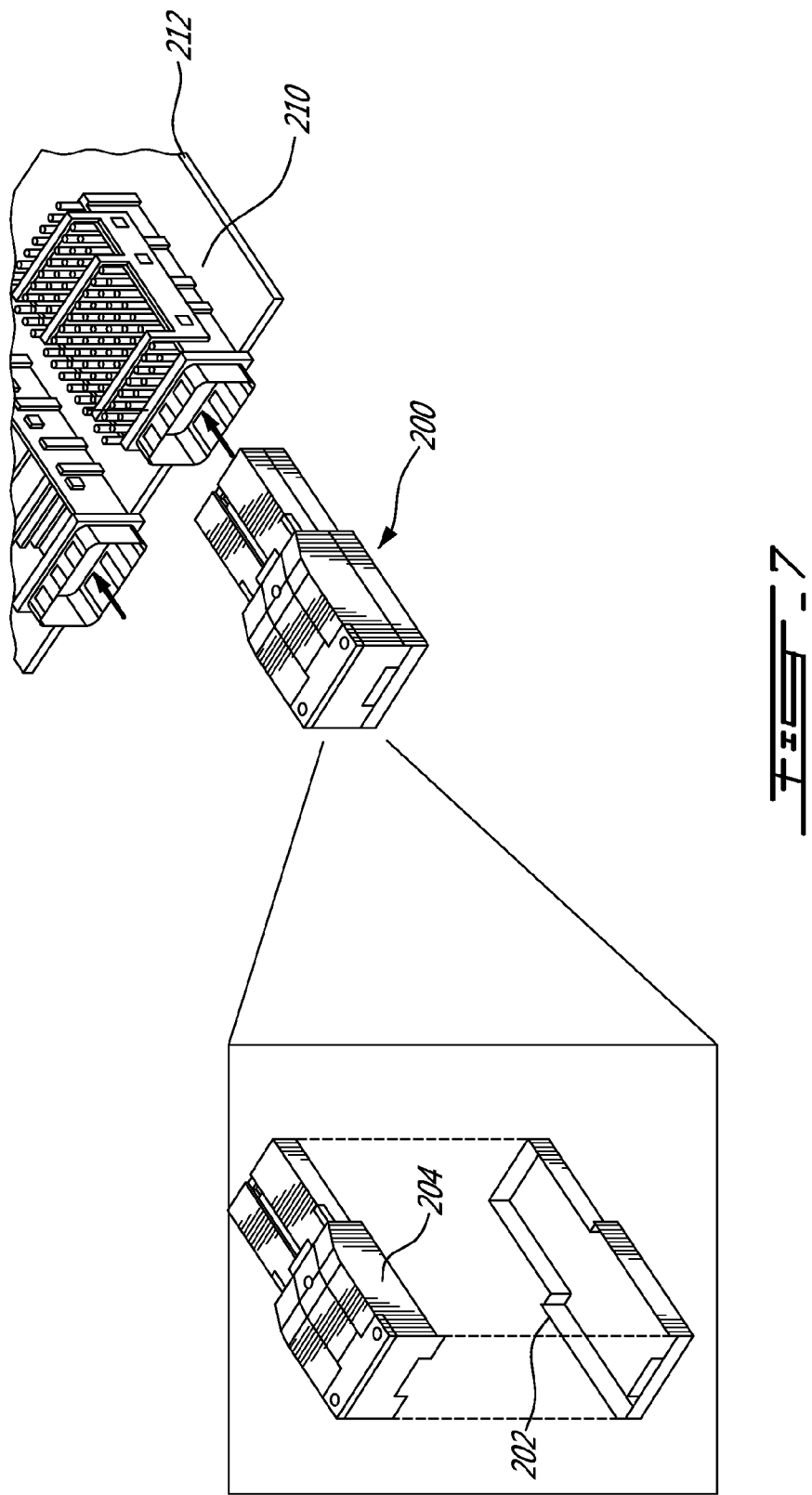
FIG. 7 is a diagram of a module cage for housing a plurality of function-specific network interface modules cascaded together at the edge of a circuit card according to an embodiment.

FIG. 7 illustrates an embodiment of several function-specific network interface modules 100 cascaded together in a single module cage 200 which is plugged into a corresponding adapter/connector/receptacle 210 disposed at the edge of a circuit board 212. FIG. 7 also shows an enlarged view of the module cage 200, which includes a lower housing part 202 for receiving network interface modules 100 (not shown in FIG. 7) and an upper housing part 204 for enclosing the modules 100. When the module cage 200 is plugged into the adapter/connector/receptacle 210, this end of the cage 200 may form a signal connection with the adapter/connector/receptacle 210 on the circuit board 212. Alternatively the connection interface 104/106 of the network interface module 100 closest to the circuit board 212 can form a direct connection with the board connector 210.

Figure 8:
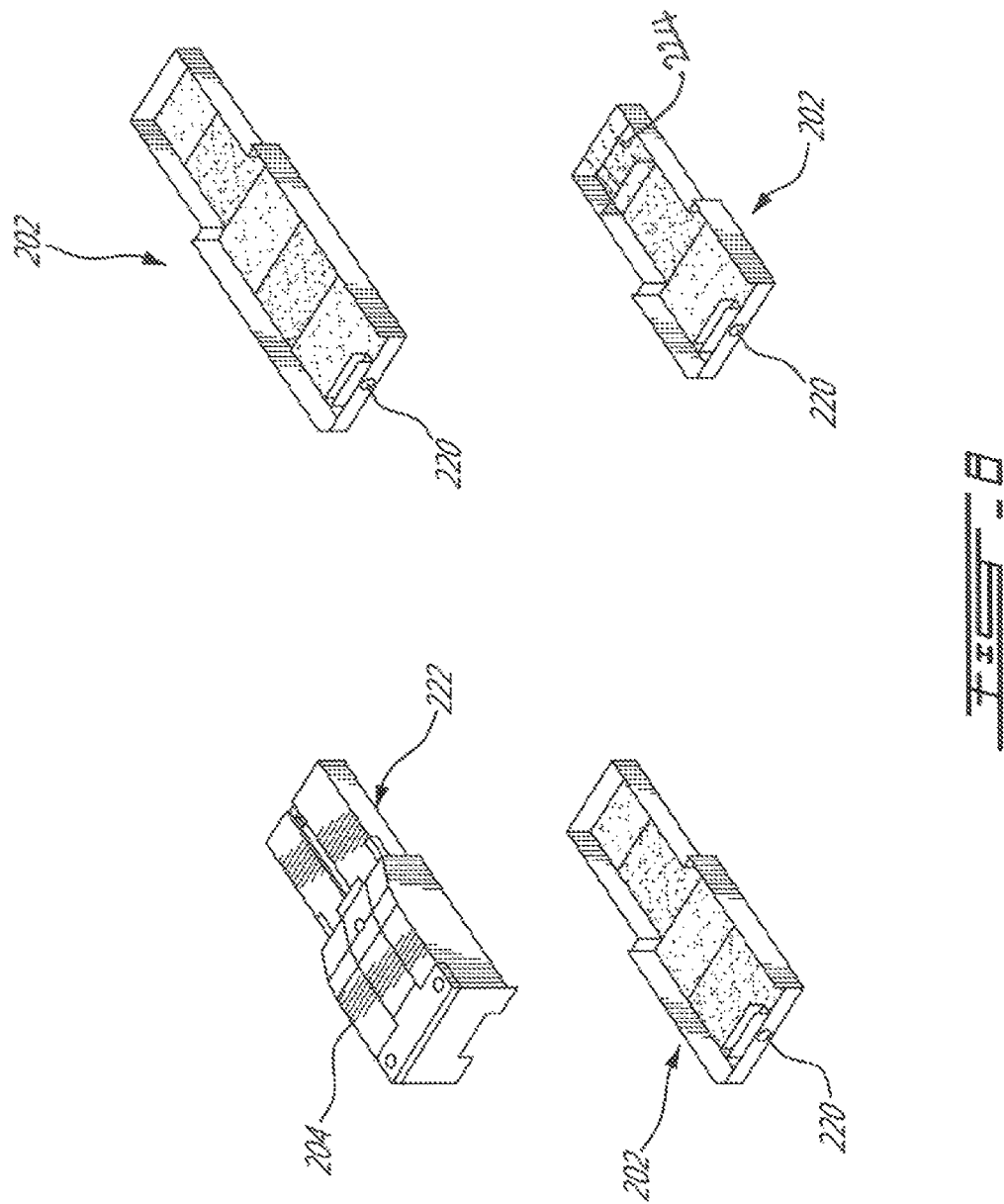
FIG. 8 is a diagram of a module cage for housing a plurality of function-specific network interface modules cascaded together at the edge of a circuit card according to additional embodiments.

FIG. 8 illustrates other embodiments of module cages 200 configured to house several function-specific network interface modules 100. Module cages 200 of different sizes can be used. In the lower right example, the lower housing part 202 has three sections for cascading three network interface modules 100 in a module cage 200. In the lower left example, the lower housing part 202 has four sections for cascading four network interface modules 100 in a module cage 100. And in the upper right example, the lower housing part 202 has five sections for cascading five network interface modules 100 in a module cage 100.

In order to cascade function-specific network interface modules 100, a physical attachment mechanism is provided. In one embodiment, the connection interface 104, 106 of each function-specific network interface module 100 is a zero-force-insertion (ZIF) interface which allows the modules 100 to be cascaded without applying any insertion force. To ensure good contact between cascaded modules 100, so-called Zero Back Lash (ZBL) screws 220 can be used for tightly connecting the modules 100 together. Spring loaded contacts 222 can be used for provisioning power and control signals to the modules 100. In the case where alignment pins are used for power and/or controls signals, the spring loaded contacts 222 are optional. To align the modules 100, alignment pins or alignment rails can be used.

In the case where the full depth of a module cage 200 is not occupied by the function-specific network interface modules 100 housed within the cage 200, one or more extender modules 224 as shown in FIG. 8 can be provided to fill the open gap in the module cage 200 and provide a signal connection over the gap to the network interface modules 100 included in the cage 200. The extender modules 224 allow, for example, an optical cable to be connected on the edge of the module cage 200 without having to be inserted inside the cage itself. Depending on the size of the module cage 200 and the number of network interface modules 100 deployed, more than one extender module 224 may be required. The extender modules 224 can have the same or similar shape connection interfaces 104, 106 as the function-specific network interface modules 100 for being readily received by the cage 200 and plug-compatible with the network interface modules 100.

Alternatively, function-specific network interface modules 100 can be cascaded inside an MSA-compliant module cage. MSA module cages, such as module cages for SFP+, QSFP, CFP and XFP, are typically built with numerous physical constraints. Some of these constraints are related to power dissipation, which could, for example, dictate the minimum size of a physical interface module. As the technology evolves, new MSA form-factors are developed in order to reduce the size and power, and increase the bandwidth of those network interface modules. One limitation of this type of MSA specification is that physical interface modules are typically specified for a range of network interconnects technologies, which often translates into non-optimized solutions. For example, when a smaller module becomes available, a new MSA specification needs to be specified, requiring redesign of PCBs in order to benefit from the smaller module package.

The empty space of an MSA module cage can be used to fit one or more function-specific network interface modules 100. For example, assuming that a PCB is designed with a CXP module cage, and a new CXP physical interface module may be developed with half the size of the original version, and thus there is some space left for one or more function-specific network interface modules to be cascaded within the MSA module cage.

Figure 9:
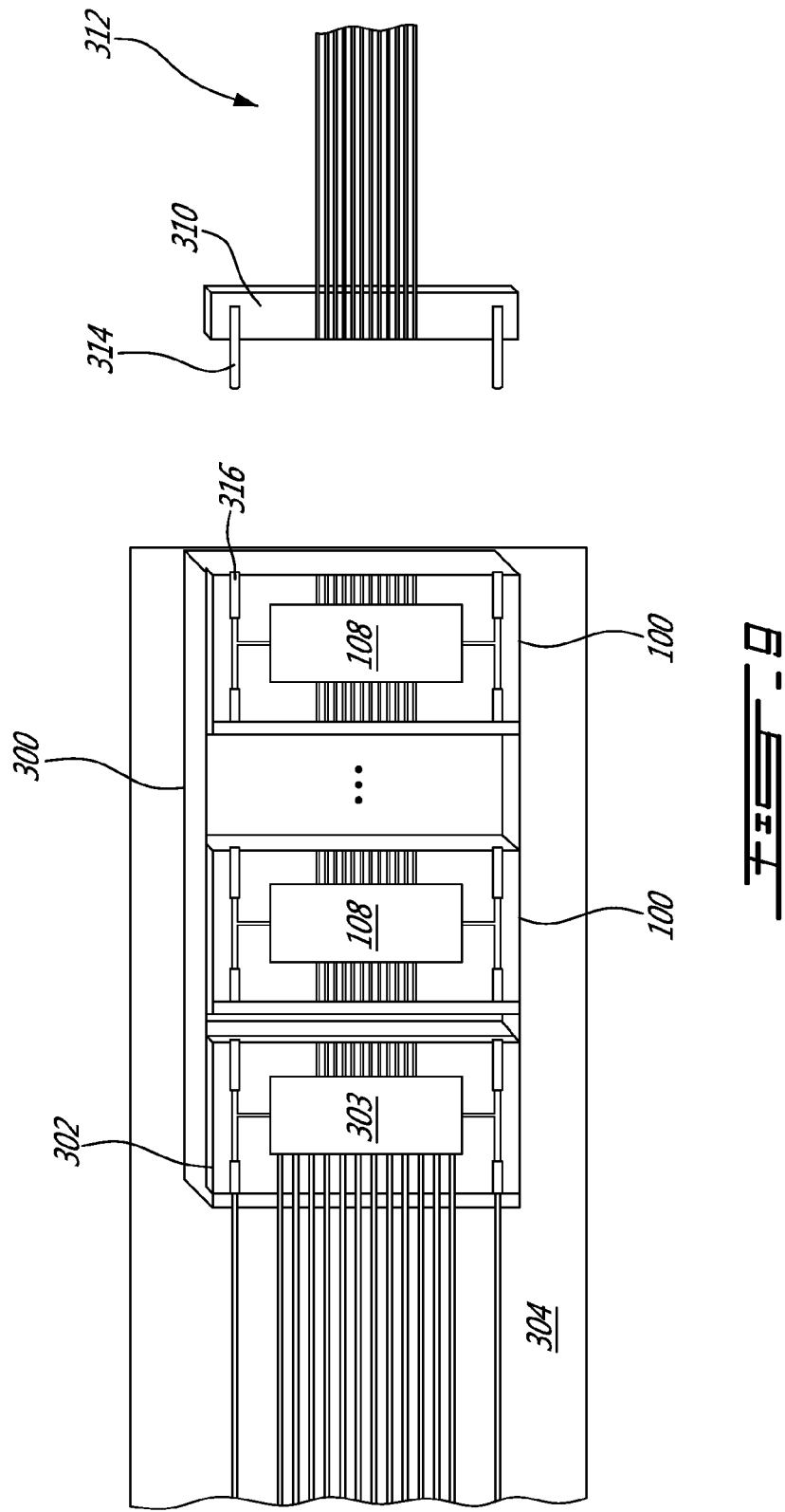
FIG. 9 is a diagram of a plurality of function-specific network interface modules cascaded together in a module cage at the edge of a circuit card according to an embodiment.

FIG. 9 illustrates an embodiment of an MSA module cage 300 with a miniaturized version of a conventional CXP physical interface module 302 with an optical engine (OE) component 303 and originally designed to fully occupy the entire MSA module cage 300. For example, this module 302 might be a conventional electrical-to-optical transceiver having an electrical interface with a circuit board 304 and optical interface toward the network. Since the miniaturized module 302 is significantly reduced in size, there is space in the MSA module cage 300 for one or more function-specific network interface modules 100. The network interface module 100 facing toward the network can connect to a corresponding adapter/connector/receptacle 310 of an optical cable 312 e.g. via a pin 314/hole 316 arrangement.

Different module cages located on a circuit board can be of different sizes, as specified by different MSA specifications, such as QSFP and CXP, as previously described herein with reference to FIGS. 7 and 8. Depending on the size of the module cage and the size of each function-specific network interface module 100 selected for a particular network application, one or more network interface modules 100 can be cascaded inside the module cage.

In the case where optical interfaces are used on the function-specific network interface modules 100, end-to-end optical connections can be used if alignment can be done through the use of alignment pins or rails. As mentioned earlier, the network interface modules 100 can be inserted according to the zero-insertion force (ZIF) concept, and tightened using ZBL screws.

Function-specific network interface modules 100 can be inserted one by one into a module cage in order to cascade them. Alternatively, the modules 100 can be assembled before insertion in the module cage. For example, assuming that the module cage can hold three function-specific network interface modules 100, these modules 100 can be physically interconnected in order to create a single device which is then inserted in or removed from a module cage as a single physical device. This approach can be viewed as a single physical interface module, built from three physically smaller function-specific network interface modules 100.

Figure 10:
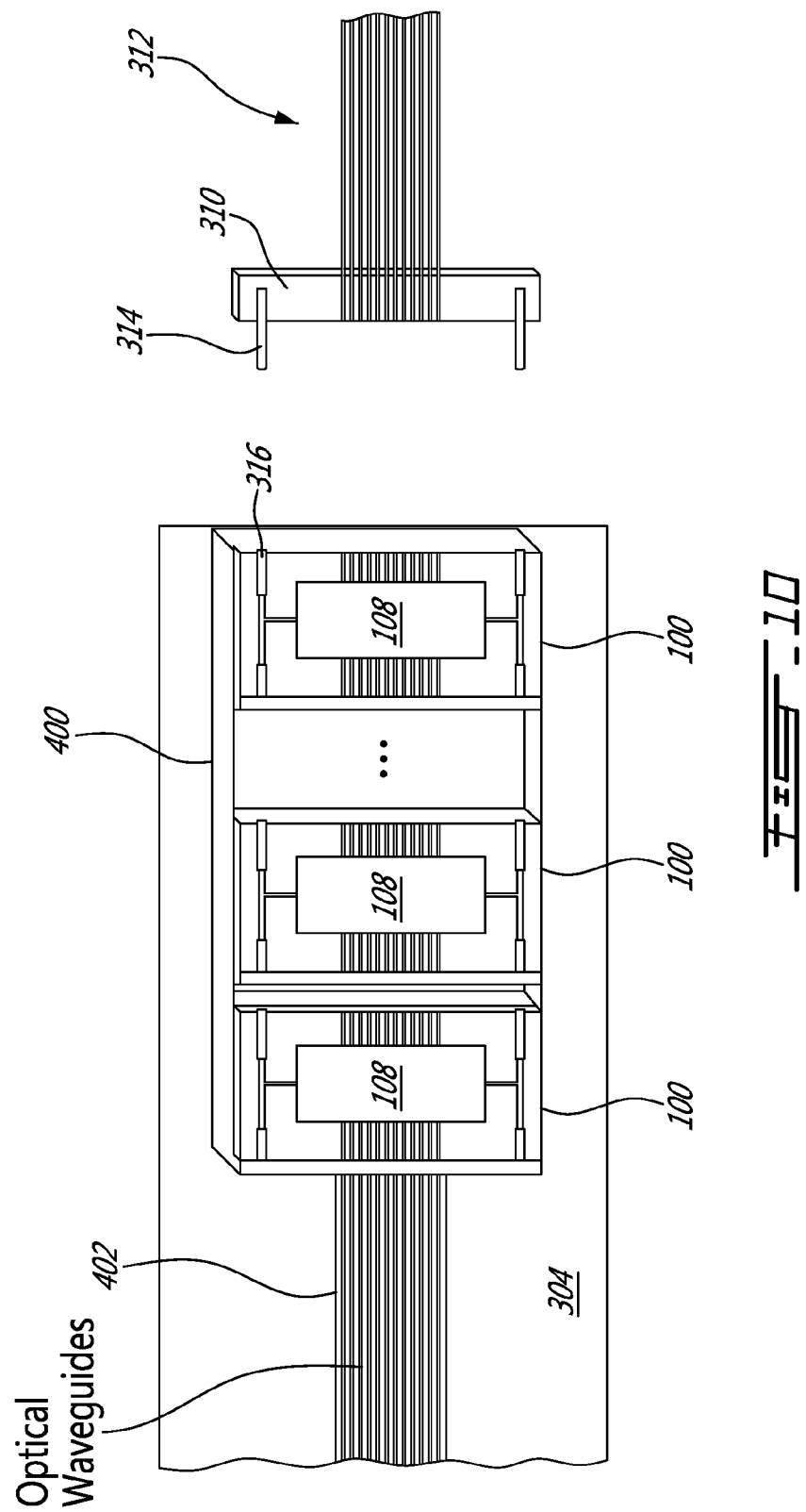
FIG. 10 is a diagram of a plurality of function-specific network interface modules cascaded together in a module cage at the edge of a circuit card according to another embodiment.

FIG. 10 illustrates an embodiment of a stack-optimized module cage 400 for providing an optical interface on the side of the circuit board 304. Unlike the module cage 300 shown in FIG. 9, the interface module 100 interfaced to the circuit board 304 has an optical interface with the board 304 in FIG. 10. For example, fiber cables or other optical waveguides 402 are used to communicate optical signals between the edge of the circuit board 304 and the first interface module 100 inserted in the module cage 400.

In comparison with the previous embodiments which cascaded multiple function-specific network interface modules 100 inside a module cage located on a circuit board, multiple function-specific network interface modules 100 can be cascaded inside a module cage which instead is located on a cable connector e.g. similar to the concept of an active optical cable (AOC).

Figure 11:
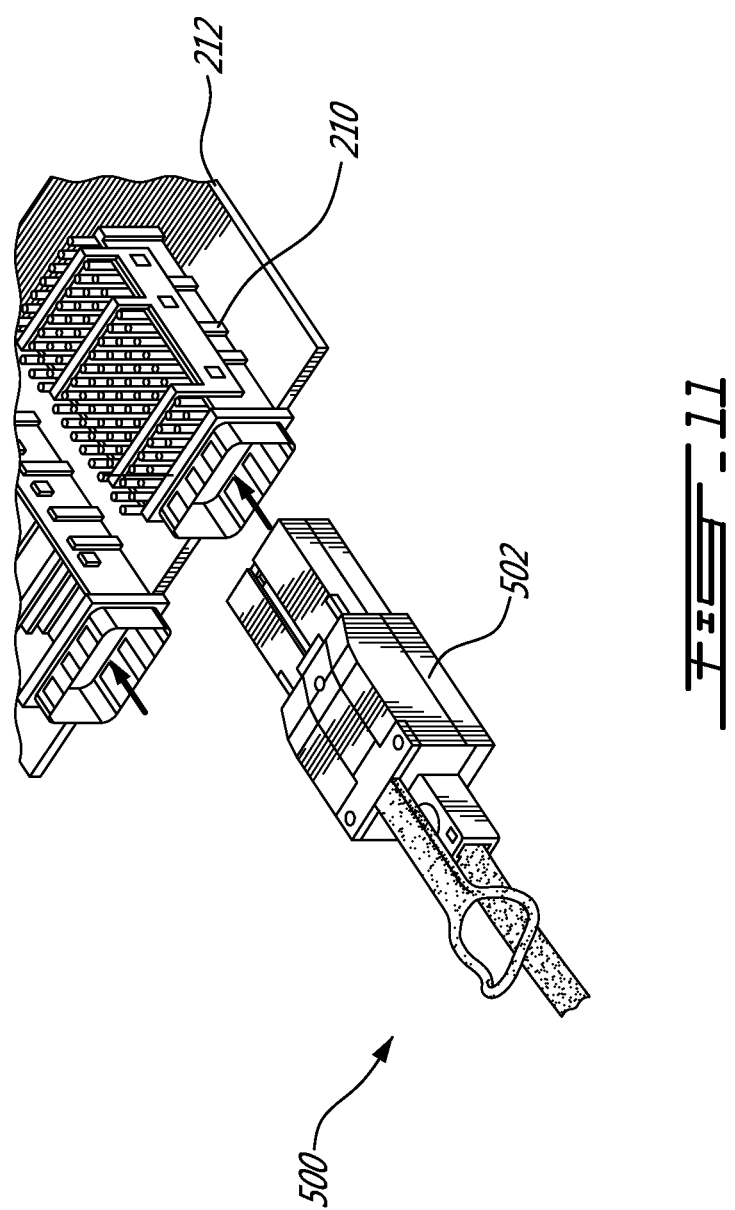
FIG. 11 is a diagram of a module cage connected to an optical cable, for housing a plurality of function-specific network interface modules cascaded together according to an embodiment.

FIG. 11 illustrates an embodiment of an optical cable 500 with a module cage 502 permanently attached to the cable 500. The module cage 502 can house several function-specific network interface modules 100 e.g. as previously described herein. This embodiment offers a strong physical housing for the modules 100, in addition to assuring good network function compatibility on both ends of the cable 500. The modules 100 may have ZIF connection interfaces and be secured with ZBL screws 220, and use alignment pins 160 and/or spring contacts 222 to provide power and/or control signals to the modules 100 as previously described herein. Also, different size module cages can be used to house different numbers of network interface modules 100 also as previously described.

Figure 12:
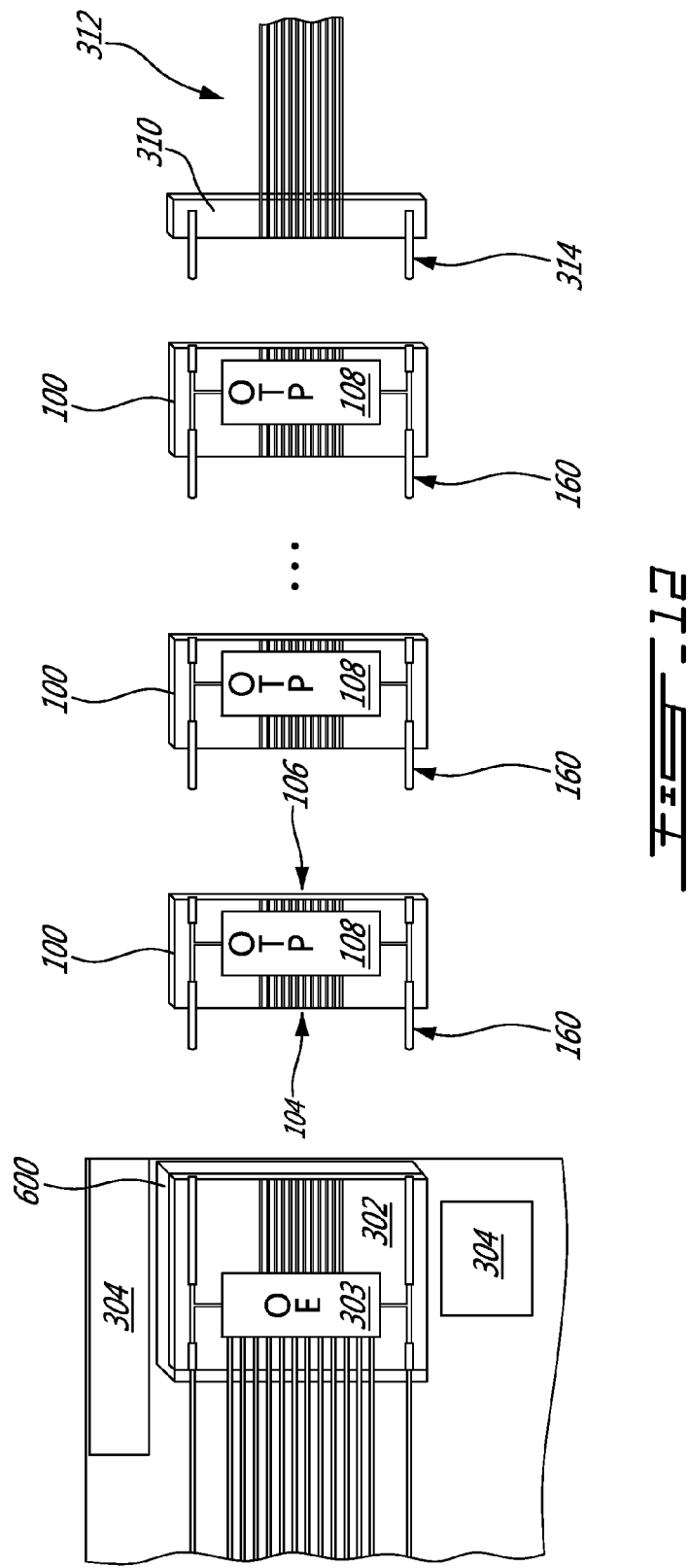
FIG. 12 is a diagram of a plurality of function-specific network interface modules cascaded together in a module cage at the edge of a circuit card according to another embodiment.

FIG. 12 illustrates an embodiment of several pluggable function-specific network interface modules 100 cascaded on the edge of a connector 600, where the circuit board 304 supports conventional pluggable physical interface modules 302. As shown in FIG. 12, the circuit board 304 has an MSA module cage 600 on an internal edge of the board 304. Different variants of an MSA-compliant physical interface module 302 can be inserted in the module cage 600. The physical interface module 302 may include an optical engine (OE) component for electrical-to-optical conversion. A fiber cable 312 can connect directly to the physical interface module 302. Alternatively, several function-specific network interface modules 100 can be cascaded between the physical interface module 302 at the edge of the circuit board 304 and the optical fiber cable 312. In this embodiment, a customized network function can be performed at the external edge of the circuit board 304 by selecting the type and sequence of network interface modules 100 between the cable 312 and the physical interface module 302 at the edge of the circuit board 304. Each module 100 can be cascaded with the other modules 100, via a compliant interface 104, 106. The function-specific network interface modules 100 may use alignment pins 160, data and control signals, as well as power as previously described herein. The function-specific network interface modules 100 include an optical transposer and processor (OTP) component 108.

Figure 13:
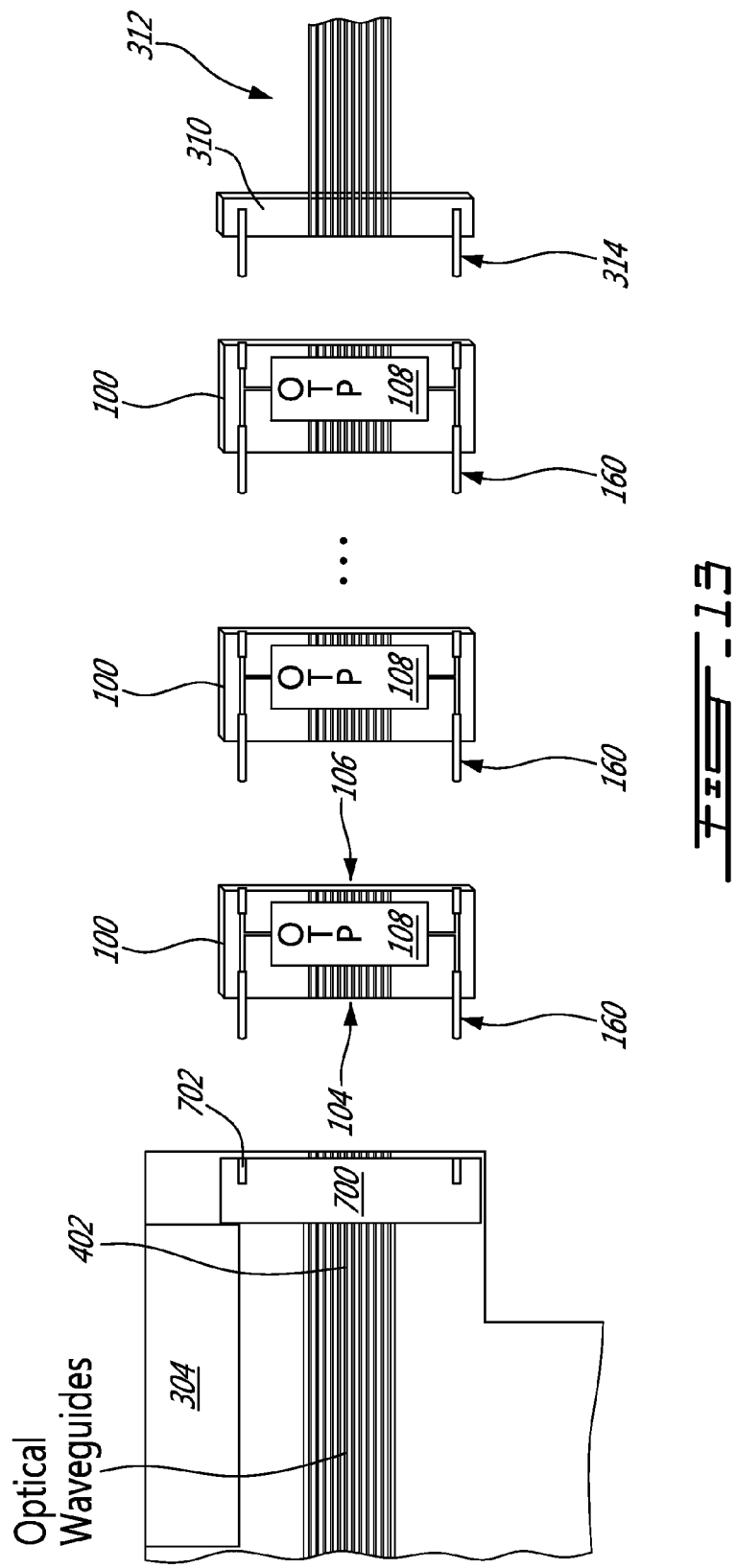
FIG. 13 is a diagram of a plurality of function-specific network interface modules cascaded together in a module cage at the edge of a circuit card according to yet another embodiment.

FIG. 13 illustrates an embodiment similar to the embodiment illustrated in FIG. 12, except the circuit board 304 does not support pluggable physical interface modules. Accordingly, an MSA module cage is not required on the circuit board 304. Instead, the circuit board 304 uses an optical engine (not shown in FIG. 13) for directly outputting optical signals. Alternatively, the optical signals can come directly from a processor or ASIC. In either case, the function-specific network interface module 100 closest to the circuit board 304 can plug into a corresponding receptacle/connector/adapter 700 disposed at the edge of the circuit board 304 for coupling to the optical signals. One or more function-specific network interface modules 100 can be placed in a module cage (not shown in FIG. 13) configured to connect to the receptacle/connector/adapter 700 at the external edge of the circuit board 304, and at the opposite end to a cable 312. The module cage holds one or more function-specific network interface modules, and provides means to the modules 100 for alignment, power and interfaces for control and data signals, if needed e.g. as previously described herein with reference to FIG. 7, 8 or 11. For example, the network interface modules 100 can have alignment pins 160 for insertion in corresponding openings 702 of the receptacle/connector/adapter 700 at the external edge of the circuit board 304.

FIG. 14 illustrates an embodiment of a plurality of cascaded function-specific network interface modules 100 without using any specific housing. According to this embodiment, a plurality of multiple function-specific network interface modules 100 are cascaded using MPO connector-based interfaces at the end of an optical fiber 800, which provide an interlocking device 802 on the MT connector heads, along with a button release clasp 804. The interlocking device 802 connects with a corresponding interlocking device on an adjacent module 100, and the button release device 804 disconnects the modules 100 when pressed.

FIG. 15 illustrates an embodiment where multiple function-specific network interface modules 100 are employed, but not all of the modules 100 fit inside the module cage 820 present on the circuit board 304. In such cases, some of the function-specific network interface modules 100 can be cascaded together inside the module cage 820 and the remaining cascaded together on the cage edge i.e. between the circuit board 304 and the cable 312 used for the communication link on the network side.

Optical backplane technologies are developing for optically-enabled systems. An optical backplane provides a way to interconnect several network devices optically using a backplane, instead of optical fiber cables. As network devices may be interconnected through a common optical backplane, a more comprehensive solution is to provide the desired customized network functions directly on the optical backplane instead of locating these functions on the edge of each network device. Such considerations also apply to optical waveguides which can be located on a single circuit board instead of a backplane.

FIG. 16 illustrates an embodiment where function-specific network interface modules 100 are cascaded together inside a module cage 900. Both ends of the module cage 900 are terminated on the same circuit board 902 which has optical waveguides 904. In this particular example, the customized network function implemented by the cascaded function-specific network interface modules 100 provides functionality to the communication channels located on the circuit board itself 902, or on an optical backplane interconnecting several network devices.

The embodiments described herein provide electrical and optical network functions packaged into modular network interface modules. By cascading these network interface modules, sophisticated electrical and optical functions can be implemented. The stacking of network interface modules allows for more flexibility related to network interfaces, by selecting the network interface modules required for the network interface and the correct sequencing of those modules. This optical function modularity, along with the capacity of cascading such modules, addresses compatibility and integration challenges of network nodes in optical networks. Also, any network nodes or devices can be adapted to the requirements and architecture of a specific electrical or optical network. Legacy MSA cages can be used to house more pluggable components inside. For example, large MSA cages can be used to cascade several network interface modules, instead of only one. Implementing network functions in independent modules which can be placed in a connector or on a connector edge utilizes the space available on the external edge of circuit boards, or systems. By moving optical functions outside of a circuit board, such as located on the external edge of a PCB, the PCB footprint can be reduced or more electronic or optical components can be mounted on the same size PCB. Using network interface modules to implement different network functions allows optical backplanes to perform optical functions as specified by cascading different optical modules.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A network interconnect for connecting with a connector, comprising a first physical interface connector and a second physical interface connector, each physical interface connector comprising a housing having a first physical connection interface and a second physical connection interface, the first physical interface connector comprising a first circuit component that provides a first network signal processing function in addition to transceiver-related functions for a signal passing along the first physical connection interface of the first physical interface connector module;

the second physical interface connector comprising a second circuit component that provides a second network signal processing function in addition to transceiver-related functions for a signal outputted from the first physical interface connector; and the first physical connection interface of the second physical connector being physically connected to the second physical connection interface of the first physical connector, thereby defining a common connection interface between the first and second physical interface connectors, wherein the network interconnect is adapted to implement a plurality of different network signal processing functions in addition to transceiver-related functions by plugging a plurality of the first and second physical interface connectors together in a cascade manner.

2. The network interconnect according to claim 1, wherein the first and second physical connection interfaces of the first physical interface connector are in opposite sides of the housing.

3. The network interconnect according to claim 1, wherein the first and second network signal processing functions are different.

4. The network interconnect according to claim 1, wherein at least one of the first physical connection interface and the second physical connection interface of at least one of the first physical interface connector and the second physical interface connector is a zero-force-insertion interface.

5. The network interconnect according to claim 1, wherein the first physical connection interface of the second physical interface connector is physically connected to the second physical connection interface of the first physical interface connector using at least one of the alignment pins and power pins.

6. The network interconnect according to claim 1, wherein the first physical connection interface of the first and second physical interface connectors includes at least one of spring loaded contacts and power pins, to provide power and control signals to the first and second physical interface connectors.

7. The network interconnect according to claim 1, wherein the first physical connection interface of the second physical interface connector and the second physical connection interface of the first physical interface connector comprise respective interlocking devices in mateable engagement.

8. The network interconnect according to claim 7, wherein one of the respective interlocking devices comprises a release device adapted to disconnect the first and second physical interface connectors.

9. The network interconnect according to claim 1, wherein the first signal is one of a power signal, a control signal and an optical signal.

10. The network interconnect according to claim 9, wherein the first signal is passed through the first physical interface connector along a physical connection selected from a group consisting of an alignment pin, a spring loaded contact and any combination of any of these.

11. The network interconnect according to claim 1, further comprising a cage for accommodating the first and second physical interface connectors.

12. The network interconnect according to claim 11, wherein the second physical interface connector comprises an extender module configured to fill a gap in the cage and provides a signal connection across the gap.

13. The network interconnect according to claim 12, further comprising a third physical interface connector having a housing which has a first physical connection interface and a second physical connection interface;

the third physical interface connector further having a third circuit component that provides a third network signal processing function for a signal outputted by the second physical interface connector;

the first physical connection interface of the third physical interface connector being pluggable and aligned with the second physical connection interface of the second physical interface connector;

wherein the third physical interface connector lies outside the cage.

14. The network interconnect according to claim 12, wherein both ends of the cage are configured to terminate on a same circuit board.

15. The network interconnect according to claim 1, wherein the first or second network signal processing function is operable for converting the signal between an electrical domain and an optical domain.

16. The network interconnect according to claim 1, wherein the first or second network signal processing function is selected from a group consisting of wavelength conversion, optical channel multiplexing, signal encoding, signal amplification, signal attenuation, filtering and any combination of any of these.

17. The network interconnect according to claim 1, wherein the first or second network signal processing function is a mode conversion function for converting the signal between multi-mode and single mode.

18. The network interconnect according to claim 1, wherein the first or second network signal processing function comprises transposing a plurality of optical signals between a plurality of optical waveguides.

* * * * *